US011858006B2

(12) United States Patent
McGrath

(10) Patent No.: US 11,858,006 B2
(45) Date of Patent: Jan. 2, 2024

(54) SYSTEM FOR SORTING DELIVERY ITEMS AND METHODS FOR THE SAME

(71) Applicant: UNITED STATES POSTAL SERVICE, Washington, DC (US)

(72) Inventor: Joseph W. McGrath, Arlington, VA (US)

(73) Assignee: UNITED STATES POSTAL SERVICE, Washington, DC (US)

(*) Notice: Subject to any disclaimer, the term of this patent is extended or adjusted under 35 U.S.C. 154(b) by 178 days.

(21) Appl. No.: 17/335,783

(22) Filed: Jun. 1, 2021

(65) Prior Publication Data
US 2021/0370353 A1 Dec. 2, 2021

Related U.S. Application Data

(60) Provisional application No. 63/032,787, filed on Jun. 1, 2020.

(51) Int. Cl.
*B07C 3/18* (2006.01)
*B65G 1/02* (2006.01)
*G08B 5/38* (2006.01)
*B07C 3/10* (2006.01)

(52) U.S. Cl.
CPC ............... *B07C 3/18* (2013.01); *B65G 1/023* (2013.01); *G08B 5/38* (2013.01); *B07C 3/10* (2013.01); *B07C 2301/0008* (2013.01); *B65G 2203/0216* (2013.01); *B65G 2203/0233* (2013.01)

(58) Field of Classification Search
CPC .. B07C 3/14; B07C 3/008; B07C 3/18; B07C 7/005; B07C 3/10; B07C 2301/0008; B65G 1/023; B65G 2203/2016; B65G 2203/0233; G08B 5/38
See application file for complete search history.

(56) References Cited

U.S. PATENT DOCUMENTS

| 5,881,890 A * | 3/1999 | Wiley ..................... B07C 7/005 209/703 |
| 6,878,896 B2 * | 4/2005 | Braginsky ............... B07C 7/005 700/214 |
| 9,192,965 B2 * | 11/2015 | Serjeantson .............. B07C 3/06 |
| 9,592,983 B2 * | 3/2017 | Costanzo .................. B07C 3/00 |
| 2005/0167342 A1 * | 8/2005 | Vullriede .................. B07C 1/00 705/401 |

* cited by examiner

Primary Examiner — Patrick H Mackey
(74) Attorney, Agent, or Firm — MH2 TECHNOLOGY LAW GROUP, LLP

(57) ABSTRACT

Systems and methods for sorting delivery items are disclosed. The system may include an intake area, a sorting area operably coupled with the intake area, and a computing system operably coupled with the intake area and the sorting area. The intake area may include a source of delivery items having a plurality of delivery items, and a scanner for scanning respective indicia of each of the plurality of delivery items. The sorting area may include a conveyor having a respective sensor disposed at opposing end portions thereof, one or more sort locations disposed about the conveyor, and one or more indicators configured to indicate a proper sort location for the delivery items. The computing system may receive data corresponding to a delivery item from the scanner, determine the proper sort location for the delivery item, and send a signal to the indicator to indicate the proper sort location.

20 Claims, 3 Drawing Sheets

SYSTEM FOR SORTING DELIVERY ITEMS AND METHODS FOR THE SAME

CROSS-REFERENCE TO RELATED APPLICATIONS

This application claims priority to U.S. Provisional Patent Application No. 63/032,787, filed on Jun. 1, 2020, the contents of which is incorporated herein by reference to the extent consistent with the present disclosure.

BACKGROUND

With most delivery services, such as the United States Postal Service (USPS), UPS, and FedEx, the process of delivering multiple delivery items to various recipients involves sorting delivery items (e.g., mail, packages, etc.) to ensure the items are carried along appropriate delivery routes. Handing of the delivery items occurs at processing/sorting facilities, which may generally include physical buildings with suitable equipment and infrastructure to process and sort the delivery items. For example, the processing/sorting facilities may utilize intricate conveyor systems, such as Sorting and Material Handling (SMH) systems, to internally sort, direct, and distribute the delivery items to the appropriate delivery routes. These conveyor systems generally operate autonomously with sensors that read respective indicia (e.g., address info) of each of the delivery items and mechanical elements that sort, direct, and distribute the delivery items to the appropriate sort locations or delivery routes.

While some processing/sorting facilities may utilize automated conveyor systems, relatively smaller processing/sorting facilities and/or facilities with limited resources may often manually sort, direct, and distribute the delivery items with operators (e.g., manpower). For example, the operators may manually read or scan the respective indicia of each of the delivery items, determine a respective sort or output location (e.g., cart, bin, sack, etc.) for each of the delivery items based on the indicia, and place each of the delivery items in the appropriate sort location. Utilizing operators to sort, direct, and distribute the delivery items, however, is slow, inefficient, and prone to errors. Further, the sort or output locations are often dynamic; and thus, subject to change depending on the needs of the respective facilities.

What is needed, then, are cost-effective systems and methods for improving the processing and/or sorting of delivery items by operators in smaller facilities having minimal automation or otherwise.

BRIEF SUMMARY

This summary is intended merely to introduce a simplified summary of some aspects of one or more implementations of the present disclosure. Further areas of applicability of the present disclosure will become apparent from the detailed description provided hereinafter. This summary is not an extensive overview, nor is it intended to identify key or critical elements of the present teachings, nor to delineate the scope of the disclosure. Rather, its purpose is merely to present one or more concepts in simplified form as a prelude to the detailed description below.

The foregoing and/or other aspects and utilities embodied in the present disclosure may be achieved by providing a system for sorting delivery items. The system may include an intake area, one or more sorting areas operably coupled with the intake area, and a computing system operably coupled with the intake area and each of the one or more sorting areas. The intake area may include a source of delivery items comprising a plurality of delivery items. The intake area may also include a scanner configured to scan respective indicia of each of the plurality of delivery items. Each of the one or more sorting areas may include a conveyor, a first sensor, a second sensor, one or more sort locations, and one or more indicators. The conveyor may be configured to move the plurality of delivery items from a first end portion towards a second end portion thereof. The first sensor may be disposed in the first end portion of the conveyor and configured to determine the presence or absence of a delivery item from among the plurality of delivery items at the first end portion of the conveyor. The second sensor may be disposed in the second end portion of the conveyor and configured to determine the presence or absence of the delivery item at the second end portion of the conveyor. The one or more sort locations may be disposed about the conveyor, and the one or more indicators may be configured to indicate a proper sort location of the one or more sort locations for the delivery item. The computing system may be configure to perform one or more of the following operations: receiving, from the scanner, data corresponding to the delivery item from among the plurality of delivery items, determining the proper sort location for the delivery item based at least in part on the data from the scanner, sending a signal to the one or more indicators to indicate the proper sort location for the delivery item from among the one or more sort locations, or combinations thereof.

In at least one implementation, each of the one or more sorting areas may include a plurality of sort locations, and at least one indicator of the one or more indicators may be configured to indicate each of the plurality of sort locations.

In at least one implementation, the one or more indicators may be lights, and sending the signal to the one or more indicators to indicate the proper sort location for the delivery item may include sending a signal to the at least one indicator to illuminate the proper sort location.

In at least one implementation, each of the one or more sorting areas may include a plurality of sort locations and a single indicator. The single indicator may be configured to indicate each of the plurality of sort locations according to the signal.

In at least one implementation, the system may include a first sorting area and a second sorting area, and the first and second sorting areas may be disposed directly adjacent to one another.

In at least one implementation, the system may include a first sorting area and a second sorting area. Each of the first and second sorting areas may be disposed directly adjacent to the intake area and configured to receive the delivery items directly therefrom.

In at least one implementation, the system may further include a roller table associated with at least one of the one or more sorting areas. The roller table may be configured to receive and store the delivery items.

In at least one implementation, the system may further include at least one sort location disposed about the roller table.

In at least one implementation, the scanner may be a handheld scanner wirelessly coupled with the computing system.

In at least one implementation, the system may further include an accumulator area operably coupled with the one or more sorting areas and configured to receive and store the delivery items. The accumulator area may include a conveyor, a first sensor, and a second sensor. The conveyor may be configured to move the delivery items from a first end portion towards a second end portion thereof. The first sensor may be disposed in the first end portion of the conveyor of the accumulator area. The second sensor may be disposed in the second end portion of the conveyor of the accumulator area.

In at least one implementation, the one or more indicators may include a display operably and communicably coupled with the computing system. The display may be configured to indicate the proper sort location of the one or more sort locations for each of the plurality of delivery items.

The foregoing and/or other aspects and utilities embodied in the present disclosure may be achieved by providing a method for sorting delivery items. The method may include scanning an indicia of a delivery item from a source of delivery items with a scanner of an intake area. The method may also include transmitting data corresponding to the indicia of the delivery item from the scanner to a computing system. The method may further include disposing the delivery item on a first end portion of a conveyor of a sorting area. The method may also include moving the delivery item from the first end portion of the conveyor toward a second end portion of the conveyor. The method may also include determining, with the computing system, a proper sort location among a plurality of sort locations of the sorting area for the delivery item based at least in part on the data from the scanner. The method may also include sending a signal from the computing system to an indicator of the sorting area to indicate the proper sort location for the delivery item. The method may also include disposing the delivery item in the proper sort location indicated by the indicator. The method may also include determining that the delivery item is disposed in the proper sort location indicated by the indicator.

In at least one implementation, the indicator may include a light, and the method may include receiving, at the indicator, the signal from the computing system to indicate the proper sort location for the delivery item, and illuminating the proper sort location with the light.

In at least one implementation, the method may further include detecting an incorrectly sorted delivery item with one or more sensors of the sorting area and the computing system.

In at least one implementation, the method may include indicating the presence of the incorrectly sorted delivery item with the indicator.

In at least one implementation, the indicator is a light, and indicating the presence of the incorrectly sorted delivery item includes flashing the light.

In at least one implementation, the method may include directing at least one delivery item from the source of delivery items to a conveyor of an accumulator area. The method may further include storing the at least one delivery item on the conveyor of the accumulator area.

In at least one implementation, the method may include tracking the delivery item along the conveyor with the indicator.

The foregoing and/or other aspects and utilities embodied in the present disclosure may be achieved by providing a system for sorting delivery items. The system may include one or more sorting areas configured to receive a plurality of delivery items. Each of the sorting areas may include a conveyor configured to move the plurality of delivery items from a first end portion towards a second end portion thereof, a first sensor disposed in the first end portion of the conveyor and configured to determine the presence or absence of a delivery item from among the plurality of delivery items at the first end portion of the conveyor, a second sensor disposed in the second end portion of the conveyor and configured to determine the presence or absence of the delivery item at the second end portion of the conveyor, one or more sort locations disposed about the conveyor, and one or more indicators configured to indicate a proper sort location of the one or more sort locations for the delivery item. The system may also include a computing system operably coupled with each of the one or more sorting areas. The computing system may be configured to perform one or more of the following operations: determining the proper sort location of the one or more sort locations for the delivery item based at least in part on data related to an indicia of the delivery item, sending a signal to the one or more indicators to indicate the proper sort location for the delivery item, or combinations thereof.

In at least one implementation, the system may further include one or more of a roller-table, an accumulator area, or combinations thereof, operably coupled with the one or more sorting areas and configured to receive and store the delivery item from the one or more sorting areas. The accumulator areas may include a conveyor configured to move the plurality of delivery items from a first end portion towards a second end portion thereof, a first sensor disposed in the first end portion of the conveyor of the accumulator area, and a second sensor disposed in the second end portion of the conveyor of the accumulator area.

Further areas of applicability of the present disclosure will become apparent from the detailed description provided hereinafter. It should be understood that the detailed description and specific examples, while indicating some typical aspects of the disclosure, are intended for purposes of illustration only and are not intended to limit the scope of the disclosure.

BRIEF DESCRIPTION OF THE DRAWINGS

The present disclosure is best understood from the following detailed description when read with the accompanying Figures. It is emphasized that, in accordance with the standard practice in the industry, various features are not drawn to scale. In fact, the dimensions of the various features may be arbitrarily increased or reduced for clarity of discussion.

DETAILED DESCRIPTION

The following description of various typical aspect(s) is merely exemplary in nature and is in no way intended to limit the disclosure, its application, or uses.

As used throughout this disclosure, ranges are used as shorthand for describing each and every value that is within the range. It should be appreciated and understood that the description in a range format is merely for convenience and brevity, and should not be construed as an inflexible limitation on the scope of any embodiments or implementations disclosed herein. Accordingly, the disclosed range should be construed to have specifically disclosed all the possible subranges as well as individual numerical values within that range. As such, any value within the range may be selected as the terminus of the range. For example, description of a range such as from 1 to 5 should be considered to have specifically disclosed subranges such as from 1.5 to 3, from 1 to 4.5, from 2 to 5, from 3.1 to 5, etc., as well as individual numbers within that range, for example, 1, 2, 3, 3.2, 4, 5, etc. This applies regardless of the breadth of the range.

Additionally, all numerical values are "about" or "approximately" the indicated value, and take into account experimental error and variations that would be expected by a person having ordinary skill in the art. It should be appreciated that all numerical values and ranges disclosed herein are approximate values and ranges, whether "about" is used in conjunction therewith. It should also be appreciated that the term "about," as used herein, in conjunction with a numeral refers to a value that may be ±0.01% (inclusive), ±0.1% (inclusive), ±0.5% (inclusive), ±1% (inclusive) of that numeral, ±2% (inclusive) of that numeral, ±3% (inclusive) of that numeral, ±5% (inclusive) of that numeral, ±10% (inclusive) of that numeral, or ±15% (inclusive) of that numeral. It should further be appreciated that when a numerical range is disclosed herein, any numerical value falling within the range is also specifically disclosed.

As utilized herein, the term "delivery item" may refer to an item, mail piece, package, or the like delivered by any delivery service, government or private. Illustrative delivery items may be or include, but are not limited to, printed materials, flats, letters, packages, parcels, boxes, oversized items, machinable objects, nonmachinable objects (NMOs), or the like, or combinations thereof. Illustrative delivery items may also be or include, but are not limited to, bounded bundles, containers, trays, or other items used to assemble and transport a plurality of individual items, or the like, or combinations thereof.

Figure 1:
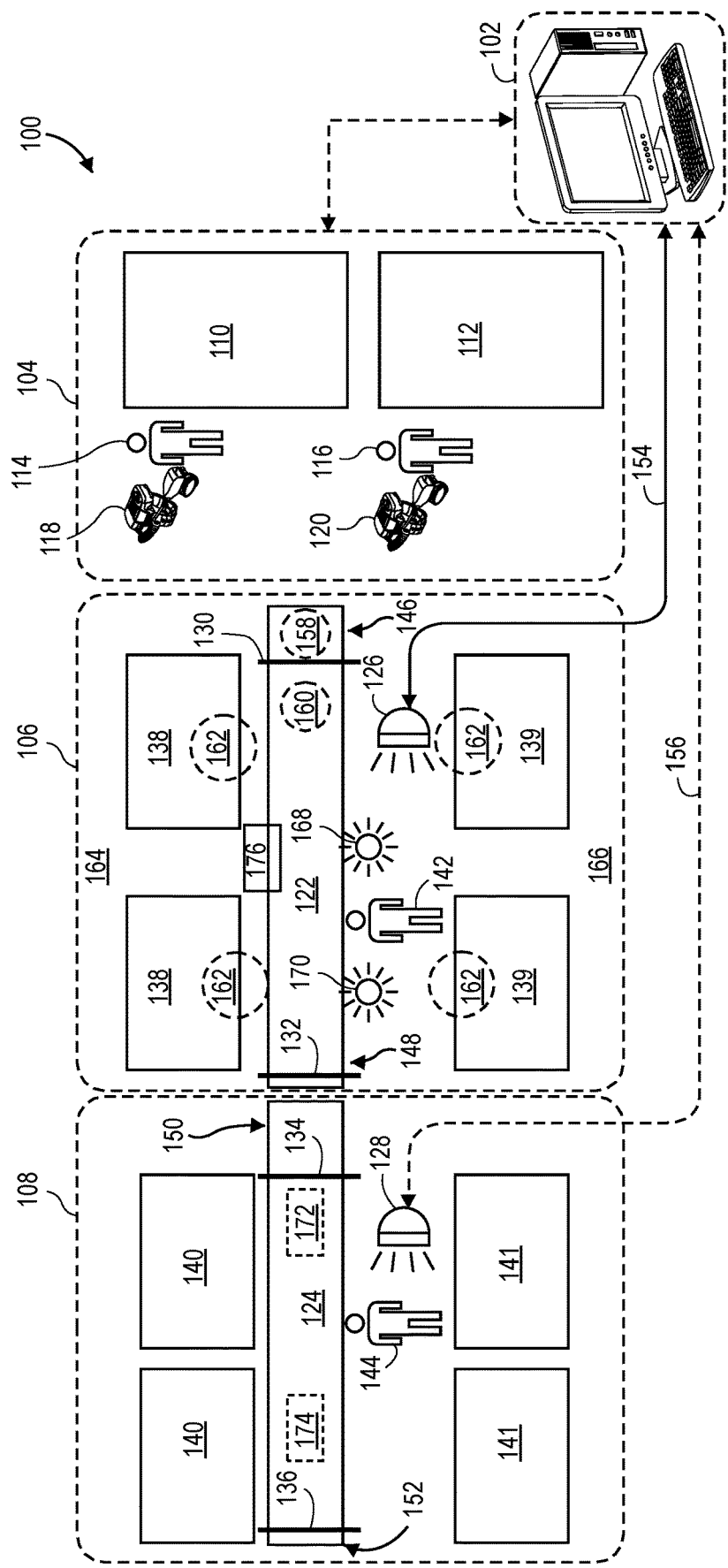
FIG. 1 illustrates a schematic diagram of an exemplary system for processing and sorting a plurality of delivery items, according to one or more implementations disclosed.

FIG. 1 illustrates a schematic diagram of an exemplary system 100 for processing and sorting a plurality of delivery items, according to one or more implementations. The system 100 may include one or more computing systems (one is shown 102), one or more intake areas (one is shown 104), one or more sorting areas (two are shown 106, 108), or combinations thereof, operably and/or communicably coupled among one another (e.g., adjacent to one another and/or with conveyors or other equipment that is configured to interoperate or move items from one area(s) into another area(s)). The intake area 104 may be capable of or configured to receive the delivery items and direct the delivery items to the one or more sorting areas 106, 108. The sorting areas 106, 108 may be capable of or configured to receive the delivery items from the intake area 104 and sort the delivery items.

The intake area 104 may include one or more sources of delivery items (two are shown 110, 112) and one or more operators (two are shown 114, 116) associated with the one or more of sources of delivery items 110, 112. Examples of a source of delivery items are containers, bins, boxes, or the like, and the end of a conveyor device. Each of the sources of delivery items 110, 112 may include a plurality of delivery items (not shown) to be sorted. Each of the delivery items of or in the sources of delivery items 110, 112 may include an indicia or label indicating or providing the respective delivery address for each of delivery items. Illustrative indicia may be or include, but is not limited to, address information in the form of text, symbols, or the like, such as name and address, postal code (e.g., USPS Zone Improvement Plan or ZIP codes), or the like, or combinations thereof. The indicia may be in a machine-readable format. For example, the indicia may be in the form of text, barcode, quick response (QR) code, or any other machine-readable format.

Each of the operators 114, 116 may be associated with one or more of the sources of delivery items 110, 112. For example, a first operator 114 may be associated with a first source of delivery items 110, and a second operator 116 may be associated with a second source of delivery items 112. In another example, each of the first and second operators 114, 116 may be associated with both the first and second sources of delivery items 110, 112.

In at least one implementation, the intake area 104 may include a dedicated scanner (e.g., a bar code scanner, an OCR scanner, a PASS cart scanner, etc.) for the operators 114, 116 thereof. In another implementation illustrated in FIG. 1, the intake area 104 or the operators 114, 116 thereof may each include or be associated with a respective scanner 118, 120. Each of the scanners 118, 120 may be capable of or configured to scan or otherwise read an indicia of each of the delivery items. The scanner 118, 120 may be operably and/or communicably coupled with the computing system 102. For example, the scanner 118, 120 may be communicably coupled with the computing system 102 via a wired or wireless connection. For example, each of the scanners 118, 120 may be capable of or configured to communicate with the computing system 102 via a wired connection. In another example, each of the scanners 118, 120 may be capable of or configured to communicate with the computing system 102 via a wireless connection, such as via a transceiver (not shown) (e.g., Bluetooth transceiver, RF access point, or the like). In at least one implementation, the scanner 118, 120 may be a wearable wireless scanner. For example, each of the scanners 118, 120 may be a wireless ring scanner Model RS507, which is commercially available from Zebra Company of Lincolnshire, IL or a wireless ring scanner Model 8670, which is commercially available from Honeywell of Charlotte, NC In another implementation, the scanner 118, 120 may include a digital camera or a camera-equipped smart phone or tablet operably and/or communicably coupled with the computing system 102.

It should be appreciated that each of the sorting areas 106, 108 disclosed herein may include similar components and/or parts, and may further be similarly operated. Consequently, discussions herein regarding any one or more of the sorting areas 106, 108, the components thereof, and/or the operation thereof may be equally applicable to the remaining sorting areas 106, 108. For example, discussions regarding a first sorting area 106 and the operation thereof may be equally applicable to a second sorting area 108 and the operation thereof. In another example, discussions regarding a component of the first sorting area 106 and the operation thereof may be equally applicable to the same component of the second sorting area 108.

In at least one implementation, each of the sorting area 106, 108 may include one or more conveyors 122, 124, one or more indicators 126, 128, one or more sensors 130, 132, 134, 136, one or more sort locations 138, 139, 140, 141 one or more operators 142, 144, or combinations thereof. For example, as illustrated in FIG. 1, the first sorting area 106 may include a conveyor 122, an indicator 126, two sensors 130, 132, one operator 142, and four sort locations 138, 139. Similarly, the second sorting area 108 may include a conveyor 124, an indicator 128, two sensors 134, 136, one operator 144, and four sort locations 140, 141. In various embodiments, the indicators 126, 128 may be devices that create an audio and/or visual manifestation that is noticeable by a human operator, such as a loudspeaker(s), a light(s), an LED array, a monitor(s), a television(s), a display screen(s), or the like. In various embodiments, the sort locations 138, 139, 140, 141 may include one or more containers, carts, bins, boxes, bags, or the like into which delivery items may be sorted or placed. While FIG. 1 illustrates each of the sorting areas 106, 108 with a similar arrangement of components, it should be appreciated that in other implementations, each of the sorting areas 106, 108 may include a different amount and/or arrangement of components and parts.

The conveyors 122, 124 may be devices capable of or configured to translate or otherwise move the delivery items along a length thereof, such as a conveyor belt device. For example, a first conveyor 122 may be capable of or configured to move the delivery items from a first end portion 146 thereof (e.g., the input end) towards a second end portion 148 thereof (e.g., the output end). Similarly, a second conveyor 124 may be capable of or configured to move the delivery items from a first end portion 150 thereof towards a second end portion 152 thereof.

In at least one implementation, the conveyors 122, 124 may be capable of or configured to operably couple the sorting areas 106, 108, the intake area 104, or combinations thereof with one another. For example, as illustrated in FIG. 1, the first conveyor 122 may be capable of or configured to operably couple the first sorting area 106 with the intake area 104, and may further be capable of or configured to operably couple the first sorting area 106 with the second sorting area 108. In another example illustrated in FIG. 1, the first conveyor 122 may be capable of or configured to operably couple the intake area 104 with the second sorting area 108.

In at least one implementation, each of the conveyors 122, 124 may be operably and/or communicably coupled with one another and/or arranged relative to one another. For example, each of the conveyors 122, 124 may be operably and/or communicably coupled with one another wirelessly, via one or more wires (e.g., electrical and/or data), mechanically (e.g., clamps, mating elements, etc.), or combinations thereof. In at least one implementation, the first conveyor 122 may be operably coupled with the computing system 102 and the second conveyor 124, and configured to transmit electrical power, data, signals, or the like, or combinations thereof therebetween. For example, the first conveyor 122 may be wirelessly coupled with the computing system 102 and further coupled with the second conveyor 124 via a wire (e.g., electrical and/or data wire); thus, the first conveyor 122 may be capable of or configured to delivery electrical power to the second conveyor 124 and/or transmit data or signals between the second conveyor 124 and the computing system 102. Each of the conveyors 122, 124 may also be mechanically coupled with one another via mating elements. For example, the first end portion 150 of the second conveyor 124 may be mechanically coupled with the second end portion 148 of the first conveyor 124 to secure or couple the first and second conveyors 122, 124 with one another. While FIG. 1 illustrates the conveyors 122, 124 arranged in a linear configuration (e.g., end to end), it should be appreciated that the conveyors 122, 124 may also be arranged at any angle, such as a right angle, relative to one another.

In at least one implementation, each of the conveyors 122, 124 may be substantially similar or the same with one another. For example, the dimensions and/or features of each of the conveyors 122, 124 may be the same. In another implementation, any one or more of the conveyors 122, 124 may have different dimensions and/or features with respect to the remaining conveyors 122, 124. The conveyors 122, 124 may have a length of at least about 8 feet (ft), at least about 10 ft, at least about 12 ft, at least about 14 ft, or greater. Each of the conveyors 122, 124 may be capable of or configured to move or translate the delivery items along the length thereof at a rate of at least about 0.35 meters per second (m/s), at least about 0.5 m/s, at least about 0.8 m/s, at least about 1 m/s, at least about 1.5 m/s, or greater. The rate of each of the conveyors 122, 124 may be variable. The variable rate of the conveyors 122, 124 may be at least partially determined by one or more factors of the system 100 and/or components thereof. For example, the variable rate of the conveyors 122, 124 may be at least partially determined by the rate of operating the intake area 104, the rate of operating any one or more of the sorting areas 106, 108, the rate of any one or more of the operators 114, 116, 142, 144, the computing system 102, or the like, or combinations thereof. In at least one implementation, the rate may be determined by the computing system 102 and/or the processing/sorting facility in which the system 100 may be located.

Each of the conveyors 122, 124 may be capable of or configured to be moved relative to one or more components of the system 100. For example, each of the conveyors 122, 124 may include wheels or casters (not shown) that allows each of the conveyors 122, 124 to be moved and locked into place. In at least one implementation, each of the conveyors 122, 124 may be locked into place when power is applied thereto (e.g., when A/C power is provided). Each of the conveyors 122, 124 may also include means or mechanisms to tilt the conveyors 122, 124 on end and/or to nest the conveyors 122, 124 with one another to minimize space when the conveyors 122, 124 are stored and/or not in use. In at least one implementation, each of the conveyors 122, 124 may be stacked and/or stored on end vertically along and against a wall of the processing/sorting facility. Any one or more of the conveyors 122, 124 may be or include a Horizontal Belt Conveyor, Model TR, which is commercially available from the Gilmore-Kramer Company of West Greenwich, RI.

In at least one implementation, each of the indicators 126, 128 may be operably and/or communicably coupled with the computing system 102 (e.g., wired or wireless) and capable of or configured to receive instructions, commands, or signals therefrom. For example, as illustrated in FIG. 1, a first indicator 126 may be directly coupled with the computing system 102 via a wired connection (as indicated by the solid arrow 154) capable of or configured to allow the delivery or transmission of data, power, signals, or the like, therebetween. In another example, illustrated in FIG. 1, the second indicator 128 may be wirelessly coupled with the computing system 102 via a wireless connection (as indicated by the hashed arrow 156) capable of or configured to allow the delivery or transmission of data and/or signals therebetween. It should be appreciated that any one or more of the indicators 126, 128 may be separately coupled with a power source, or may be capable of or configured to receive power from any remaining components of the respective sorting areas 106, 108. For example, any one or more of the indicators 126, 128 may be coupled with one of the conveyors 122, 124 and configured to receive power therefrom.

The one or more indicators 126, 128 may be capable of or configured to direct or bring the attention of the operators 142, 144 to one or more locations, portions, or areas within the respective sorting area 106, 108. For example, the one or more indicators 126, 128 may be capable of or configured to direct or bring the attention of the operator 142, 144 to the one or more locations, portions, or areas within the respective sorting area 106, 108 via one or more signals (e.g., visual, audio, display, presentation recognized by the operator 142, 144, such as a color, shape, pattern, or the like, etc.). In at least one implementation, the one or more indicators 126, 128 may be capable of or configured to designate, indicate, or otherwise show the operators 142, 144 the proper sort location 138, 139, 140, 141 for a delivery item. For example, the indicator 126 of the first sorting area 106 may be capable of or configured to indicate to the operator 142 the proper sort locations 138, 139 of the first sorting area 106 to place or dispose a delivery item. For example, the indicator 126 may illuminate one of the sort locations 138, 139 or an area (shown in phantom 162) proximal the sort location 138, 139 to indicate the proper sort location 138, 139 to the operator 142. In yet another example, the one or more indicators 126, 128 may also be capable of or configured to bring the attention of the operators 142, 144 to an incoming delivery item. For example, the indicator 126, 128 may be capable of or configured to indicate one or more areas (shown in phantom 158, 160) disposed in or proximal the first end portion 146 of the first conveyor 122 to bring the attention of the operator 142 to an incoming delivery item near or proximal the respective areas 158, 160. In yet another example, the one or more indicators 126, 128 may be capable of or configured to track the delivery item along the respective length of each of the conveyors 122, 124. For example, any one or more of the indicators 126, 128 may be a device capable of illuminating the delivery item to facilitate or otherwise aid the tracking (e.g., visual tracking) of the delivery item by the operator 142, 144. In at least one implementation, any one or more of the indicators 126, 128 may be a motorized spotlight capable of or configured to maintain constant or temporary illumination of the delivery item along the respective conveyor 122, 124 to facilitate the tracking of the delivery item by the operators 142, 144. Illustrative indicators may be or include, but are not limited to, fixed spotlights, motorized spotlights, video projector, lasers, LEDs, or the like, or combinations thereof.

While FIG. 1 illustrates each of the sorting areas 106, 108 including a single indicator 126, 128, it should be appreciated that each of the sorting areas 106, 108 may include a plurality of indicators. For example, each of the sorting areas 106 may include a dedicated indicator (e.g., fixed spotlight) for each of the areas 158, 160, 162 and/or each of the sorting locations 138, 139, 140, 141. In at least one implementation, each of the dedicated indicators is a spotlight fixed to a beam, rail, channel, or the like disposed above the respective conveyor.

In at least one implementation, the indicator 126, 128 for any one or more of the sorting areas 106, 108 may be or include a display or monitor (not shown). The display may be operably and/or communicably coupled with the computing system 102 and configured to communicate therewith. The display may be capable of or configured to show the arrangement or configuration of each of the components of the respective sorting area 106, 108. For example, the display may be capable of or configured to show the arrangement of the sort locations 138, 139, 140, 141 about the respective conveyors 122, 124. The display may be capable of or configured to illustrate or show an image of each delivery item to the operator 142, 144, and may further be capable of or configured to indicate or illustrate which sort location 138, 139, 140, 141 the delivery item is to be disposed. For example, the display and/or the computing system 102 operably coupled therewith may designate a symbol (e.g., letter, number, shape, text, color, etc.) to each of the sorting locations 138, 139, 140, 141, and may further illustrate that symbol on an image of the delivery item on the display to indicate the proper sorting location 138, 139, 140, 141. The display may be capable of or configured to illustrate or show an image of the delivery item moving along a representative image of the respective conveyor 122, 124 in real-time for the operator 142, 144 to facilitate tracking of the delivery item along the respective conveyor 122, 124.

The one or more sensors 130, 132, 134, 136 of each of the sorting areas 106, 108 may be capable of or configured to determine when a delivery item is present and/or absent along one or more predetermined positions of the respective conveyor 122, 126. For example, a first sensor 130 of the first sorting area 106 may be disposed in or proximal the first end portion 146 of the conveyor 122 thereof and configured to determine if and/or when the delivery item is present at or proximal the first end portion 146. In another example, illustrated in FIG. 1, a second sensor 132 of the first sorting area 106 may be disposed in or proximal the second end portion 148 of the conveyor 122 thereof and configure to determine if and/or when the delivery item is present at or proximal the second end portion 148. Illustrative sensors may be or include, but are not limited to, photoelectric sensors, digital cameras, mechanical gates or switches, or any other device suitable for determining the presence and absence of the delivery item along the conveyors 122, 124, or the like, or combinations thereof.

Each of the sensors 130, 132, 134, 136 may be operably and/or communicably coupled with the computing system 102 (e.g., wired or wireless) and capable of or configured to receive and/or send instructions, commands, or signals therewith. For example, each of the sensors 130, 132, 134, 136 may be operably and/or communicably coupled with the computing system 102 and configured to send data and/or signals thereto related to the presence and/or absence of the delivery item along the predetermined positions of the respective conveyor 122, 124. For example, the first sensor 130 may be configured to send a signal or data to the computing system 102 when the delivery item is present at or proximal the first end portion 146 of the conveyor 122. Similarly, the second sensor 132 may be configured to send a signal or data to the computing system 102 when the delivery item is present at or proximal the second end portion 148 of the conveyor 122. It should be appreciated that any one or more of the sensors 130, 132, 134, 136 may be separately coupled with a power source, or may be capable of or configured to receive power from any remaining components of the respective sorting area 106, 108. For example, any one or more of the sensors 130, 132, 134, 136 may be coupled with one of the conveyors 122, 124 and configured to receive power therefrom.

In at least one implementation, the sort locations 138, 139, 140, 141 of each of the respective sorting areas 106, 108 may be disposed proximal the respective conveyors 122, 124 thereof. For example, as illustrated in FIG. 1, the sort locations 138 may be disposed proximal the first conveyor 122 on a first side 164 thereof, and the sort locations 139 may be disposed proximal the first conveyor 122 on a second side 166 thereof. Each of the sort locations 138, 139, 140, 141 may be capable of or configured to receive and store the delivery items. For example, each of the sort locations 138, 139, 140, 141 may be or include a container capable of or configured to receive and store the delivery items. Illustrative containers may be or include, but are not limited to, bins, trays, wire cages, roller tables, racks, or the like, or combinations thereof. In an exemplary implementation, any one or more of the sort locations 138, 139, 140, 141 may be or include a conveyance device, system, or method capable of or configured to transport the delivery items to another operation or process. For example, any one or more of the sort locations 138, 139, 140, 141 may be, be associated with, include, or have a roller table, a slide, or a conveyor similar to the conveyors 122, 124 disclosed herein.

Each of the sort locations 138, 139, 140, 141 may correspond to a predetermined or specified location. Illustrative locations that each of the sort locations 138, 139, 140, 141 may correspond to may be or include, but are not limited to, a location (e.g., physical location) in a processing/sorting facility, a particular ZIP code, a range of ZIP codes, another sorting/processing facility, another intake area, another system, another sorting area, another operation or process within the facility, or the like.

In at least one implementation, each of the sorting areas 106, 108 may include one or more additional indicators 168, 170 capable of or configured to direct the attention of the operators 142, 144 of the respective sorting areas 106, 108 toward the first or second side 164, 166 of the conveyors 122, 124. For example, as illustrated in FIG. 1, the first sorting area 106 may include the additional indicators 168, 170 disposed between the first and second sides 164, 166 of the conveyor 122. In at least one example, a first additional indicator 168 may correspond to the first side 164 of the conveyor 122 and a second additional indicator 170 may correspond to the second side 166 of the conveyor 122. As such, the first additional indicator 168 may be actuated or otherwise "turned on" when a delivery item is to be disposed or placed in the sort locations 168 disposed on the first side 164 of the conveyor 122. Similarly, the second additional indicator 170 may be turned on when a delivery item is to be disposed or placed in the sort locations 139 disposed on the second side 166 of the conveyor 122. In at least one implementation, the additional indicators 168, 170 may be fixed, stationary, or otherwise not motorized. It should be appreciated that in at least one implementation, the indicators 126, 128 discussed above may also be capable of or configured to direct the attention of the operators 142, 144 of the respective sorting areas 106, 108, toward the first or second side 164, 166 of the conveyors 122, 124. It should further be appreciated that the additional indicators 168, 170 may operate in conjunction with the indicators 126, 128 discussed above. In one example, both the additional indicators 168, 170 and the indicators 126, 128 may be operably coupled with the computing system 102, and the computing system 102 may operate the additional indicators 168, 170 and the indicators 126, 128 in conjunction with one another.

In at least one implementation, each of the sorting areas 106, 108 may include one or more audio devices 172, 174 capable of or configured to output sound. Illustrative audio devices 172, 174 may be or include speakers. The audio devices 172, 174 may be disposed on or about any one or more of the conveyors 122, 124. For example, as illustrated in FIG. 1, a first audio device 172 may be disposed at or proximal the first end portion or inlet 150 of the second conveyor 124, and a second audio device 174 may be disposed at or proximal the second end portion or outlet 152 of the second conveyor 124. Each of the audio devices 172, 174 may be operably and/or communicably coupled with the computing system 102 (e.g., wired or wireless) and capable of or configured to receive signals therefrom. It should be appreciated that any one or more of the audio devices 172, 174 may be separately coupled with a power source, or may be capable of or configured to receive power from any other components of the respective sorting areas 106, 108. For example, any one or more of the audio devices 172, 174 may be coupled with one of the conveyors 122, 124 and configured to receive power therefrom.

The audio devices 172, 174 may be capable of or configured to communicate with the operators 142, 144 and/or bring the attention of the operators 142, 144 to one or more locations, portions, or areas of the system 100 or the respective sorting areas 106, 108. In at least one implementation, the audio devices 172, 174 may be capable of or configured to output a predetermined sound, such as an alarm sound, to indicate an event, such as an emergency event or an event that requires the attention of the operators 142, 144. For example, the audio devices 172, 174 may be capable of or configured to indicate an unexpected delivery item. In another implementation, the audio devices 172, 174 may be capable of or configure to bring the attention of the operators 142, 144 to a delivery item at, near, or proximal the respective sorting areas 106, 108. For example, the audio devices 172, 174 may be capable of or configured to indicate the movement of the delivery item along the system 100 or a component thereof (e.g., the conveyors 122, 124) by increasing or decreasing the volume of the sound from each of the audio devices 172, 174. In another example, the audio devices 172, 174 may be capable of or configured to play a predetermined sound when the delivery item is at a predetermined position along the conveyors 122, 124. Each of the audio devices 172, 174 may be operated independently or cooperatively with one another. For example, the volume of the first audio device 172 may be decreased while the volume of the second audio device 174 may be increased. In another example, the audio devices 172, 174 may operate together to provide stereo sound.

In at least one implementation, the audio devices 172, 174 may be capable of or configured to facilitate engagement of the operators 142, 144. For example, the audio devices 172, 174 may be capable of or configured to play sound clips, music (e.g., songs), sound effects, or the like, or combinations thereof. The audio devices 172, 174 may facilitate or encourage cooperation between the operators 142, 144 and/or improve productivity. For example, the audio devices 172, 174 may be configured to play music when the system 100 reaches a predetermined throughput for a predetermined amount of time, or if the throughput of the system 100 is near or at a historical maximum.

The computing system 102 may include one or more microprocessors (e.g., a server, a personal computer, a tablet computer, or the like, or combinations thereof) capable of or configured to execute instructions and/or software, such as sort instructions or sort software. The computing system 102 may include or have access to a storage media or machine-readable media that stores the sort software, instructions for sorting, or a sort plan that provides data regarding respective sort or output locations 138, 139, 140, 141, for each of the delivery items. The computing system 102 may be operably and/or communicably coupled with a network (not shown) to facilitate or enable communication with other stored media and/or computing systems that may perform related ancillary functions. Ancillary functions may be or include, but is not limited to, returning a ZIP code corresponding to the indicia (e.g., barcode) of the respective delivery item. The computing system 102 may also be operably and/or communicably coupled with any one or more of the intake areas 104, the sorting areas 106, 108, components thereof, or combinations thereof, and configured to at least partially operate and/or communicate (e.g., send and receive instructions) therewith. For example, as previously discussed, the computing system 102 may be communicably coupled with the intake area 104 via the scanners 118, 120. In another example, the computing system 102 may be communicably coupled with each of the sorting areas 106, 108 via the respective conveyors 122, 124, the respective indicators 126, 128, the respective sensors 130, 132, 134, 136, the respective additional indicators 168, 170, or combinations thereof.

In at least one implementation, the sort software may interface with, communicate with, and/or include software developed by the USPS. The software may determine the sort locations 138, 139, 140, 141 for each of the delivery items. For example, the software may receive data from the scanners 118, 120 and/or the computing system 102 and utilize the data from the scanners 118, 120 to determine the respective ZIP code (or other information) for each of the delivery items. The software may then utilize the ZIP code for the respective delivery item and determine the proper sort location 138, 139, 140, 141 that corresponds to the ZIP code.

In at least one implementation, the computing system 102 may record and/or analyze data reflecting operations of the system 100 or one or more components thereof. The computing system 102 may record and/or analyze data concurrently or while performing sorting tasks with the system 100. For example, the computing system 102 may record and/or analyze the speed in which a delivery item is traveling through the system, how many delivery items are being sorted, how many delivery items are being scanned, the number of items processed by an operator 114, 116, 142, 144, the number of incorrectly sorted delivery items, or the like, or any combination thereof. The computing system 102 may then produce metrics indicating the efficiency of the system 100, the components of the system 100, and/or the operators 114, 116, 142, 144 of the system 100. Illustrative metrics may be or include, but are not limited to, efficiency, operator productivity, error rate, average time to sort, or the like.

In at least one implementation, each of the sorting areas 106, 108 may further include one or more operator interfaces 176 (one is shown). The operator interfaces 176 may be disposed on or about the respective conveyor 122, 124 of each of the sorting areas 106, 108. For example, as illustrated in FIG. 1, the operator interface 176 may be coupled with the first conveyor 122 between the first end portion 146 and the second end portion 148 thereof. As further illustrated in FIG. 1, the operator interface 176 may be disposed on the first side 164 of the conveyor 122. While FIG. 1 illustrates the operator interface 176 on the first side 164 of the conveyor 122 between the first and second end portions 146, 148 thereof, it should be appreciated that any one or more operator interfaces 176 may be disposed on the first side 164, on the second side 166, at or about the first end portion 146, at or about the second end portion 148, between the first and second end portions 146, 148, or any combination thereof.

The operator interface 176 may be capable of or configured to facilitate communication with or between one or more of the operators 114, 116, 142, 144. For example, the operator interface 176 may include a microphone, a push to talk intercom, or combinations thereof. The operator interface 176 may allow or facilitate communications with another operator via a respective operator interface (not shown) of another sorting area, such as the second sorting area 108. For example, the operator interface 176 of the first sorting area 106 may include a push to talk intercom capable of providing communication between the operator 142 of the first sorting area 106 and the operator 144 of the second sorting area 108 via the respective operator interface (not shown) of the second sorting area 108. In another example, the operator interface 176 of the first sorting area 106 may include a push to talk intercom capable of providing communication from the operator 142 of the first sorting area 106 to the operator 144 of the second sorting area 108 via the audio devices 172, 174. The operator interface 176 may also allow or facilitate communications with an operator or supervisor outside the system 100 for processing and sorting the delivery items. The operator interface 176 may also include volume controls to modulate or control the volume of the audio devices 172, 174.

The operator interface 176 may be operably and/or communicably coupled with the computing system 102, and configured to transmit electrical power, data, signals, or the like, or combinations thereof with the computing system 102. For example, the operator interface 176 may be coupled with the computing system 102 (e.g., wirelessly and/or wired) and capable of or configured to transmit data or signals with the computing system 102. In another example, the operator interface 176 may be capable of or configured to send and/or receive instructions, commands, and/or signals with the computing system 102. In at least one implementation, the operator interface 176 may include one or more switches, input devices, or buttons, capable of or configured to send a command and/or a signal to the computing system 102 to facilitate and/or control the operation of the system 100 or one or more components thereof.

In an exemplary operation of the system 100 with continued reference to FIG. 1, the operator 114, 116 designated to the intake area 104 may receive a delivery item from one of the sources of delivery items 110, 112, scan the respective indicia of the delivery item with the respective scanner 118, 120, and place or dispose the delivery item on the conveyor 122 at the first end portion 146 thereof. The scanner 118, 120 may read the indicia and transmit data related to the indicia to the computing system 102.

The computing system 102 may receive the data from the scanner 118, 120 and determine a respective or proper sort location 138, 139, 140, 141 for the delivery item. For example, the computing system 102 may receive data from the scanner 118, 120 and utilize the data from the scanner 118, 120 to determine a respective ZIP code or delivery route or other information for the delivery item. The computing system 102 may then determine the proper sorting area 106, 108 and/or the proper sort location 138, 139, 140, 141 corresponding to the respective ZIP code or the respective delivery route for the delivery item. The computing system 102 may determine the respective ZIP code or delivery route for the delivery item by executing software, accessing the storage or machine-readable media that stores the software, accessing instructions for sorting, accessing a sort plan that provides data regarding respective sort locations 138, 139, 140, 141 for the delivery item, or combinations thereof. As further described herein, the computing system 102 may then transmit signals, transmit instructions, or otherwise operate any one or more of the sorting locations 106, 108 or components thereof to facilitate the disposition of the delivery item to the appropriate sort location 138, 139, 140, 141 as determined by the sort plan, the software, or instructions for sorting.

In at least one implementation, the computing system 102 may operate the indicator 126 of the first sorting area 106 to bring the attention of the operator 142 thereof to an incoming delivery item. For example, the computing system 102 may send instructions, signals, or commands to the indicator 126 and/or operate the indicator 126 to illuminate the area 158 disposed in the first end portion 146 of the first conveyor 122 to bring the attention of the operator 142 to the incoming delivery item.

The delivery item disposed on the conveyor 122 may move from the first end portion 146 thereof towards the second end portion 148 thereof. As the delivery item moves along the first conveyor 122, the indicator 126 may maintain constant illumination of the delivery item to facilitate tracking of the delivery item by the operator 142. The computing system 102 may also send signals, commands or instructions to the indicator 126 to illuminate the proper sort location 138, 139 for the delivery item. For example, the computing system 102 may illuminate any one of the sort locations 138, 139 of the first sorting area 106 to indicate to the operator 142 thereof of the proper sort location 138, 139 for the delivery item. It should be appreciated that if the proper sort location 138, 139, 140, 141 is located in the second sorting area 108, the computing system 102 may not illuminate any of the sort locations 138, 139 of the first sorting area 106, thereby instructing the operator 142 to allow the delivery item to move to the conveyor 124 of the second sorting location 108. In response to the indicator 126, the operator 142 may place the delivery item in the proper sort location 138, 139 designated by the indicator 126.

As the delivery item moves along the conveyors 122, 124, the one or more sensors 130, 132, 134, 136 thereof may detect the presence or absence of the delivery item at one or more predetermined locations along the respective conveyors 122, 124, and transmit the data or information regarding the presence or absence of the delivery item to the computing system 102. For example, as illustrated in FIG. 1, the first sensor 130 may determine when the delivery item is present or absent at the first end portion 146 of the first conveyor 122, and may further communicate that information or data to the computing system 102. Similarly, the second sensor 132 may determine if and/or when the delivery item is present or absent at the second end portion 148 of the first conveyor 122, and may further communicate that information or data to the computing system 102.

The computing system 102 may receive the information regarding the presence or absence of the delivery item from the first and/or second sensors 130, 132 and utilize the information to operate one or more components and/or functions of the system 100. For example, the computing system 102 may be capable of or configured to determine the exact or approximate location of the delivery item along the respective conveyor 122, 124 by utilizing the rate or speed of the conveyor 122, 124 and the data (e.g., presence and/or absence) from the first and/or second sensors 130, 132, 134, 136. The computing system 102 may also be capable of or configured to determine when or if the delivery item is incorrectly sorted. For example, the computing system 102 may determine that the delivery item was incorrectly sorted when the second sensor 132 at the second end portion or outlet 148 of the first conveyor 122 indicates the presence of a delivery item that should have been sorted in one of the sort locations 138, 139 of the first sorting area 106. Similarly, the computing system 102 may determine that the delivery item was incorrectly sorted when the second sensor 132 at the second end portion or outlet 148 and/or the first sensor 134 at the first end portion or inlet 150 of the second conveyor 124 does not indicate the presence of the delivery item that should have been sorted in one of the sort locations 140, 141 of the second sorting area 108.

In at least one implementation, the computing system 102 may alert any operator 114, 116, 142, 144 of the system 100 of an incorrectly sorted delivery item. For example, the computing system 102 may indicate an incorrectly sorted delivery item by operating any one or more of the indicators 126, 128 of the sorting areas 106, 108. For example, upon determining that the delivery item was incorrectly sorted, the computing system 102 may strobe or flash any one or more of the indicators 126, 128 to alert or communicate with the operators 114, 116, 142, 144 that the delivery item was incorrectly sorted.

In at least one implementation, the computing system 102 may operate one or more components of the system 100 to facilitate the correction of the incorrectly sorted delivery item. For example, upon determining that the delivery item was incorrectly sorted, the computing system 102 may send signals, commands or instructions to any one or more of the conveyors 122, 124 to reduce the rate of, reverse movement, or stop the conveyors 122, 124 and thereby allow the operators 142, 144 sufficient time to correctly sort the delivery item to the proper sort location 138, 139, 140, 141.

Figure 2:
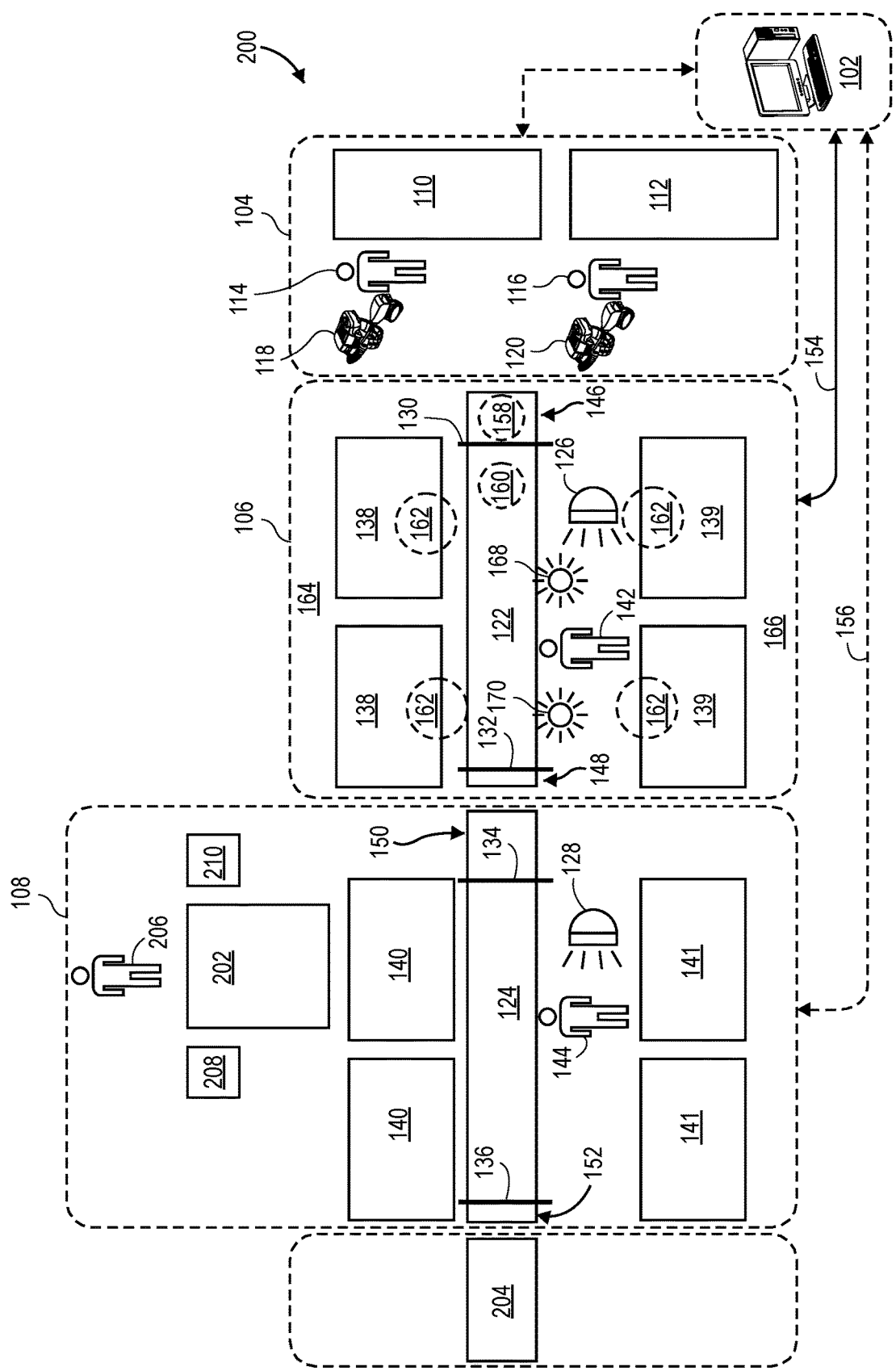
FIG. 2 illustrates a schematic diagram of another exemplary system for processing and sorting a plurality of delivery items, according to one or more implementations disclosed.

FIG. 2 illustrates a schematic diagram of another exemplary system 200 for processing and sorting a plurality of delivery items, according to one or more implementations. The system 200 may be similar in some respects to the system 100 described above and therefore may be best understood with reference to the description of FIG. 1 where like numerals may designate like components and will not be described again in detail.

The system 200 may include one or more roller-tables (two are shown 202, 204) operably coupled with and/or forming a portion of any one of the sorting areas 106, 108. For example, as illustrated in FIG. 2, a first roller-table 202 may be incorporated with the second sorting area 108. As illustrated in FIG. 2, one of the sorting locations 140, 141 of the second sorting area 108 may be or may be replaced with a roller-table 202. In another example, a second roller-table 204 may be disposed proximal or adjacent to the second sorting area 108. Particularly, the second roller-table 204 may be disposed adjacent to the second end portion or output 152 of the conveyor 124 of the second sorting area 108.

In at least one implementation, one or more sort locations 208, 210 may be disposed proximal or adjacent the one or more roller-tables 202, 204. For example, as illustrated in FIG. 2, two sort locations 208, 210 may be disposed adjacent the first roller-table 202. In at least one implementation, an operator 206 may be associated with the one or more of the roller-table 202, 204 and/or the sort locations 208, 210. For example, the operator 206 may be associated with, responsible for, or assigned to the first roller-table 202 and the sort locations 208, 210 disposed adjacent thereto. In another implementation, no operator may be associated with one or more of the roller-tables 202, 204. For example, no operator is associated with or assigned to the second roller-table 204. It should be appreciated that the second roller-table 204 may be capable of or configured to receive and store delivery items that are not able to be stored in any one or more of the sort locations 138, 139, 140, 141, 208, 210. For example, the second roller-table 304 may be capable of or configured to receive and store oversized delivery items (e.g., golf clubs, skis, etc.) that may not properly fit in any one or more of the sort locations 138, 139, 140, 141, 208, 210. In at least one example, the second roller-table 204 may be capable of or configured to receive and store delivery items for subsequent sorting, such as sorting in another system. It should be appreciated that utilizing any of the roller-tables 202, 204 for storage of the delivery items will preserve the order of the delivery items. As such, in operation, an operator may scan the first delivery item (i.e., delivery item at the end of the roller-table 202, 204), the system 100 or one or more components thereof may then determine the proper location for the delivery item, and the system 100 or one or more components thereof may indicate the proper location to the operator.

It should be appreciated that any one or more of the roller-tables 202, 204 may include one or more sensors, similar to the sensors 130, 132, 134, 136 discussed above, capable of or configured to determine when a delivery item is present and/or absent along one or more predetermined positions of the roller-table 202, 204. As such, it should be appreciated that the computing system 102 may be capable of or configured to determine if and/or when the roller-tables 202, 204 are full. For example, the roller-tables 202, 204 may include a sensor (not shown) at (e.g., first and/or second end portion) an inlet and/or an outlet thereof.

Figure 3:
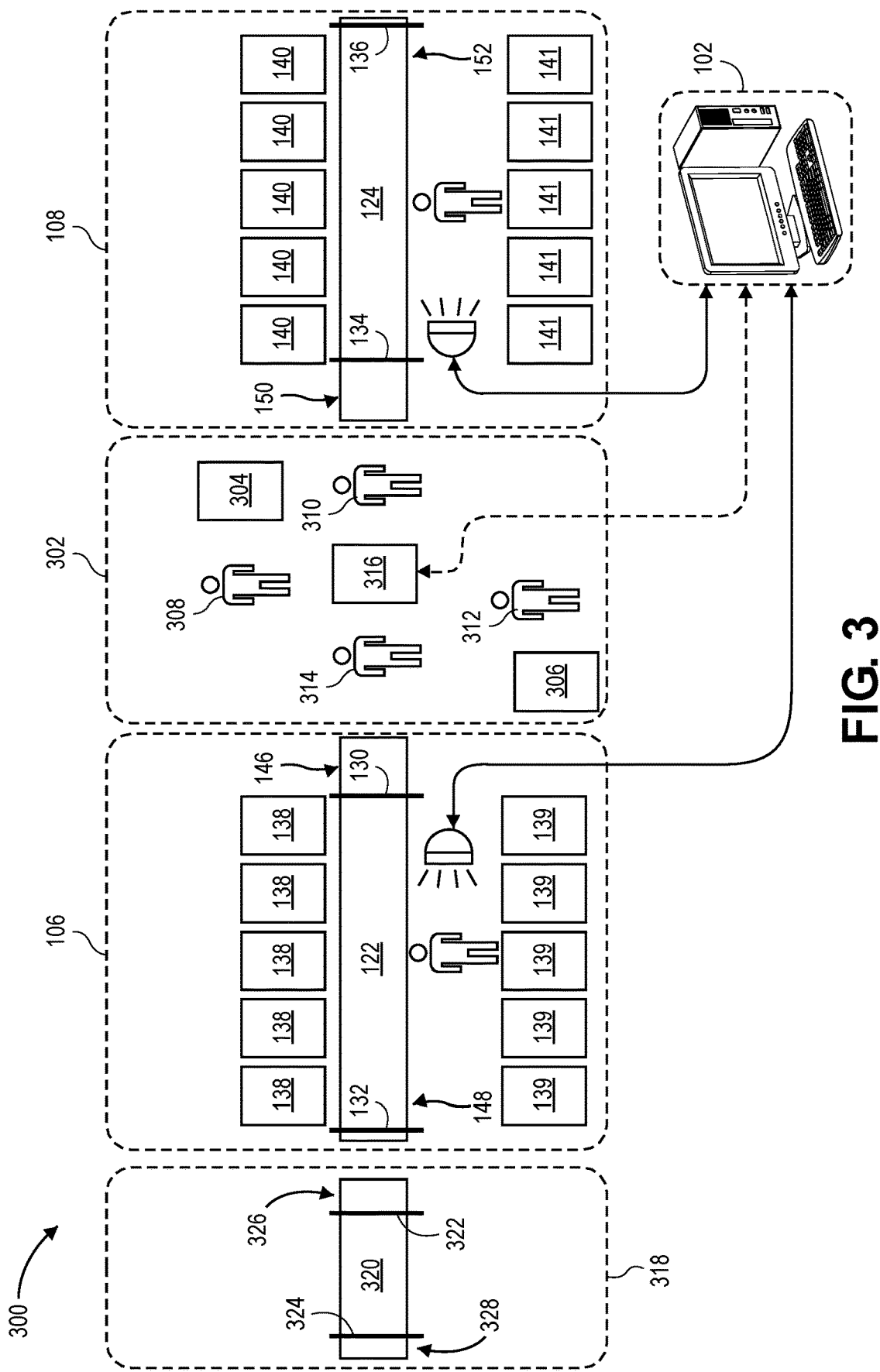
FIG. 3 illustrates a schematic diagram of another exemplary system for processing and sorting a plurality of delivery items, according to one or more implementations disclosed.

FIG. 3 illustrates a schematic diagram of another exemplary system 300 for processing and sorting a plurality of delivery items, according to one or more implementations. The system 300 may be similar in some respects to the system 100 described above and therefore may be best understood with reference to the description of FIG. 1 where like numerals may designate like components and will not be described again in detail.

The system 300 may include the computing system 102, an intake area 302, and two sorting areas 106, 108 operably and/or communicably coupled with one another. The first and second sorting areas 106, 108 may both be directly operably and/or communicably coupled with the intake area 302 and capable of receiving the delivery items directly therefrom. For example, as illustrated in FIG. 3, the first sorting area 106 may be disposed adjacent the intake area 302 such that the first end portion or inlet 146 of the conveyor 122 is disposed proximal or adjacent to the intake area 302. As further illustrated in FIG. 3, the second sorting area 108 may be disposed adjacent the intake area 302 such that the first end portion or inlet 150 of the conveyor 124 is disposed proximal or adjacent to the intake area 302.

The intake area 302 may include two sources of delivery items (two are shown 304, 306) and one or more operators (four are shown 308, 310, 312, 314) associated with one or more of the sources of delivery items 304, 306. For example, as illustrated in FIG. 3, at least two of the operators 308, 310 may be associated with a first source of delivery items 304, and at least two of the operators 312, 314 may be associated with a second source of delivery items 306. The intake area 302 may also include a dedicated scanner 316 (e.g., PASS cart scanner) capable of or configured to scan or otherwise read respective indicia of each of the delivery items. The scanner 316 may be operably and/or communicably coupled with the computing system 102 via a wired or wireless connection. It should be appreciated that the dedicated scanner 316 may be utilized in lieu of or may be utilized in combination with the scanners 118, 120 previously discussed with respect to FIG. 1.

In an exemplary operation of the system 300 with continued reference to FIG. 3, the operators 308, 310, 312, 314 designated to the intake area 302 may receive a delivery item from one of the sources of delivery items 304, 306, scan the respective indicia of the delivery item with the dedicated scanner 316, and directly place or dispose the delivery item on the conveyor 122 of the first sorting area 106 or the conveyor 124 of the second sorting area 108. It should be appreciated that directly coupling the first and second sorting areas 106, 108 to the intake area 302 may increase the efficiency and/or productivity of sorting the delivery items by reducing the travel distance and/or time for the delivery items. For example, the delivery items may be placed directly on the proper conveyor without traveling along a series of conveyors before reaching the proper conveyor.

In at least one implementation, any one or more of the systems 100, 200, 300 disclosed herein may include one or more accumulator areas 318 capable of or configured to receive one or more delivery items and store the delivery items for later or subsequent sorting. For example, as illustrated in FIG. 3, the system 300 may include an accumulator area 318 operably and/or communicably coupled with the first sorting area 106. While FIG. 3 illustrates the accumulator area 318 as being operably and/or communicably coupled with the first sorting area 106, it should be appreciated that the accumulator area 318 may be directly or indirectly coupled with any component or portion of the system 300. For example, the accumulator area 318 may be operably and/or communicably coupled with the intake area 302, the second sorting area 108, or combinations thereof.

The accumulator area 318 may include one or more conveyors (one is shown 320) capable of or configured to receive and store the delivery items for later or subsequent sorting. The accumulator area 318 may also include one or more sensors (two are shown 322, 324) coupled with or otherwise disposed on or about the conveyor 320. For example, as illustrated in FIG. 1, a first sensor (e.g., photoelectric sensor) 322 may be disposed in or proximal a first end portion 326 of the conveyor 320, and a second sensor 324 may be disposed in or proximal a second end portion 328 of the conveyor 320. The sensors 322, 324 may be operably and/or communicably coupled with the computing system 102 and configured to send data and/or signals thereto related to the presence and/or absence of a delivery item along the conveyor 320.

As discussed above, the accumulator area 318 may be capable of or configured to receive one or more delivery items and store the delivery items for later or subsequent sorting. In an exemplary operation of the accumulator area 318 with continued reference to FIG. 3, a delivery item to be stored at the accumulator area 318 may be delivered to the conveyor 320 at the first end portion 326 thereof. The conveyors 320 may receive the deliver item from the intake area 302 or any one of the sorting areas 106, 108. For example, as illustrated in FIG. 1, the conveyor 320 may receive the delivery item from the first sorting area 106 disposed upstream thereof. The delivery item at the first end portion 326 of the conveyor 320 may be detected by the first sensor 130, and the first sensor 130 may send a signal to the computing system 102 to communicate the presence of the delivery item. In response, the computing system 102 may transmit a signal or command to the conveyor 320 to move the delivery item towards the second end portion 328 thereof. When the first sensor 322 does not indicate the presence or indicates the absence of the delivery item, the first sensor 322 may send a signal to the computing system 102 to communicate the absence of the delivery item at the first end portion 326 of the conveyor 320, and the computing system 102 may send or transmit a signal or command to the conveyor 320 to stop the movement of the delivery item towards the second end portion 328 thereof. This process may be repeated until the second sensor 324 at the second end portion 328 of the conveyor 320 detects the presence of the delivery item (e.g., the first delivery item), which may indicate that the conveyor 320 is full and may not receive any additional delivery items.

In at least one implementation, the accumulator area 318 may include one or more operators (not shown), one or more sort locations (not shown), or combinations thereof. For example, the accumulator 318 may include one or more sort locations and any number of operators assigned to the sort locations. It should be appreciated that any one of the sorting areas 106, 108 may also be utilized or converted to an accumulator areas 318

In at least one implementation, any one or more of the systems 100, 200, 300 disclosed herein may be modular such that the components of any one or more of the systems 100, 200, 300 disclosed herein may be disposed in various configurations or arrangements, as illustrated in FIGS. 1-3. For example, any one or more of the sorting areas 106, 108 may be disposed proximal or adjacent to any one or more of the roller-tables 202, 204, any one or more of the intake areas 104, 302, any one or more of the accumulator areas 318, or combinations thereof. Similarly, any one or more of the roller-tables 202, 204 may be disposed proximal or adjacent to any one or more of the intake areas 104, 302, any one or more of the accumulator areas 318, or combinations thereof. In yet another example, any one or more of the accumulator areas 318 may be disposed proximal or adjacent to any one or more of the sorting areas 106, 108, any one or more of the roller-tables 202, 204, any one or more of the intake areas 104, 302, or combinations thereof.

In at least one implementation, the computing system 102 may be capable of or configured to determine the particular configuration or arrangement of the components of the systems 100, 200, 300. For example, in operation with reference to FIG. 1, the system 100 may be arranged such that the sorting areas 106, 108 are in series. To determine the particular configuration of the system 100, a test delivery item could be placed on the first conveyor 122. The test delivery item may move along the conveyor 122 from the first end portion or inlet 146 toward the second end portion or outlet 148. As the test delivery item moves along the conveyor 122, one or more of the sensors 130, 132, 134, 136 may detect the presence of the test delivery item and communicate the presence of the test delivery item to the computing system 102. The computing system 102 may then utilize the information/data from the sensors 130, 132, 134, 136 and/or the order in which it received the information/data to determine a particular order and/or arrangement of the sorting areas 106, 108. For example, with reference to FIG. 1, as the test delivery item moves along the conveyors 122, 124 of the first and second sorting areas 106, 108, the computing system 102 may receive signals of the presence of the test delivery item from each of the sensors 130, 132, 134, 136, and utilize the order in which the computing system 102 received the signals to determine the particular order and/or arrangement of the components of the system 100. It should be appreciated that the ability of the computing system 102 to determine a particular order and/or arrangement of the sorting areas 106, 108 allows any one or more of the conveyors 122, 124 to be easily replaced (e.g., during repair operations) with a spare conveyor to restore the system 100.

It should be appreciated that various implementations of the systems 100, 200, 300 disclosed herein may improve and solve problems associated with conventional manual sorting and/or processing of delivery items. For example, the various implementations of the systems 100, 200, 300 disclosed herein may automatically read and process information from respective indicia of each of the delivery items, thereby reducing or eliminating human delay and/or error. In another example, the various implementations of the systems 100, 200, 300 disclosed herein may automatically determine and designate the proper sort location 138, 139, 140, 141 in which a delivery item should be disposed, thereby reducing or eliminating human error and/or increasing efficiency for sorting the delivery items.

The present disclosure has been described with reference to exemplary implementations. Although a limited number of implementations have been shown and described, it will be appreciated by those skilled in the art that changes may be made in these implementations without departing from the principles and spirit of the preceding detailed description. It is intended that the present disclosure be construed as including all such modifications and alterations insofar as they come within the scope of the appended claims or the equivalents thereof.

What is claimed is:

1. A system for sorting delivery items, the system comprising:
   an intake area comprising:
      a source of delivery items comprising a plurality of delivery items; and
      a scanner configured to scan respective indicia of each of the plurality of delivery items;
   one or more sorting areas operably coupled with the intake area and configured to receive the plurality of delivery items therefrom, wherein a first sorting area of the one or more sorting areas is disposed directly downstream of the intake area, and wherein each of the one or more sorting areas comprises:
      a sorting area conveyor configured to move the plurality of delivery items from a first end portion towards a second end portion thereof;
      a first sorting area sensor disposed in the first end portion of the sorting area conveyor and configured to determine the presence or absence of a delivery item from among the plurality of delivery items at the first end portion of the sorting area conveyor;
      a second sorting area sensor disposed in the second end portion of the sorting area conveyor and configured to determine the presence or absence of the delivery item at the second end portion of the sorting area conveyor;
      one or more sort locations disposed about the sorting area conveyor; and
      one or more indicators configured to indicate a proper sort location of the one or more sort locations for the delivery item;
   an accumulator area disposed directly adjacent to and operably coupled with the first sorting area and configured to receive and store the delivery items directly from the first sorting area, the accumulator area comprising:
      an accumulator area conveyor configured to move the delivery items from a first end portion thereof towards a second end portion thereof, the first end portion of the accumulator area conveyor disposed directly downstream of the first sorting area;
      a first accumulator area sensor disposed in the first end portion of the accumulator area conveyor; and
      a second accumulator area sensor disposed in the second end portion of the accumulator area conveyor; and
   a computing system operably coupled with the intake area, the accumulator area, and each of the one or more sorting areas, the computing system being configured to perform operations comprising:
      receiving, from the scanner, data corresponding to the delivery item from among the plurality of delivery items;

determining the proper sort location for the delivery item based at least in part on the data from the scanner; and sending a signal to the one or more indicators to indicate the proper sort location for the delivery item from among the one or more sort locations.

2. The system of claim 1, wherein each of the one or more sorting areas comprises a plurality of sort locations, and wherein at least one indicator of the one or more indicators is configured to indicate each of the plurality of sort locations, wherein the one or more indicators are lights, and wherein sending the signal to the one or more indicators to indicate the proper sort location for the delivery item comprises sending a signal to at least one light to illuminate the proper sort location.

3. The system of claim 1, wherein each of the one or more sorting areas comprises a plurality of sort locations and a single indicator, and wherein the single indicator is configured to indicate each of the plurality of sort locations according to the signal.

4. The system of claim 1, wherein the system further comprises a second sorting area and a third sorting area, wherein the second sorting area is disposed directly adjacent to the intake area and configured to receive the delivery items directly therefrom, and the third sorting area is disposed directly downstream of the second sorting area and configured to receive the delivery items directly therefrom.

5. The system of claim 1, wherein the system further comprises a second sorting area, wherein each of the first and second sorting areas is disposed directly adjacent to the intake area and configured to receive the delivery items directly therefrom.

6. The system of claim 1, further comprising a second sorting area and a roller table disposed directly adjacent to the second sorting area, the roller table being configured to receive and store the delivery items from the second sorting area.

7. The system of claim 6, further comprising at least one sort location disposed about the roller table.

8. The system of claim 1, wherein the scanner is a handheld scanner wirelessly coupled with the computing system.

9. The system of claim 1, wherein the one or more indicators comprise a display operably and communicably coupled with the computing system, wherein the display is configured to indicate the proper sort location of the one or more sort locations for each of the plurality of delivery items.

10. The system of claim 1, wherein the computer system is further configured to perform operations comprising:
receiving, from the first sensor of the accumulator area, a signal indicating the presence of the delivery item;
transmitting a signal to the accumulator area conveyor to move the delivery item towards the second end portion thereof;
receiving, from the first accumulator area sensor, a signal indicating the absence of the delivery item;
transmitting a signal to the accumulator area conveyor to stop the movement of the delivery item towards the second end portion thereof;
receiving, from the second accumulator area sensor, a signal indicating the presence of the delivery item at the second end portion of the accumulator area conveyor; and
indicating that the accumulator area conveyor is full.

11. The system of claim 1, wherein the computer system is further configured to perform operations comprising determining an arrangement of the intake area, the one or more sorting areas, and the accumulator area relative to one another.

12. The system of claim 1, wherein the computer system is further configured to perform operations comprising determining an arrangement of the accumulator area conveyor and the respective sorting area conveyors of each of the sorting areas relative to one another.

13. A method for sorting delivery items, the method comprising:
scanning an indicia of a delivery item from a source of delivery items with a scanner of an intake area;
transmitting data corresponding to the indicia of the delivery item from the scanner to a computing system;
disposing the delivery item on a first end portion of a sorting area conveyor of a sorting area;
moving the delivery item from the first end portion of the sorting area conveyor toward a second end portion of the sorting area conveyor;
determining, with the computing system, a proper sort location among a plurality of sort locations of the sorting area for the delivery item based at least in part on the data from the scanner;
sending a signal from the computing system to an indicator of the sorting area to indicate the proper sort location for the delivery item;
disposing the delivery item in the proper sort location indicated by the indicator;
determining that the delivery item is disposed in the proper sort location indicated by the indicator;
moving at least one delivery item from the source of delivery items to an accumulator area conveyor of an accumulator area via the sorting area conveyor; and
storing the at least one delivery item on the accumulator area conveyor, wherein storing the at least one delivery item on the accumulator area conveyor comprises:
receiving, with the computing system, a signal from a first accumulator area sensor disposed at a first end portion of the accumulator area conveyor indicating the presence of the at least one delivery item;
transmitting, with the computing system, a signal to the accumulator area conveyor to move the at least one delivery item toward a second end portion thereof;
receiving, with the computing system, a signal from the first accumulator area sensor indicating the absence of the delivery item; and
transmitting, with the computing system, a signal to the accumulator area conveyor to stop the movement of the delivery item towards the second end portion thereof.

14. The method of claim 13, wherein the indicator comprises a light, and wherein the method further comprises:
receiving, at the indicator, the signal from the computing system to indicate the proper sort location for the delivery item; and
illuminating the proper sort location with the light.

15. The method of claim 13, further comprising detecting an incorrectly sorted delivery item with one or more sensors of the sorting area and the computing system.

16. The method of claim 15, further comprising indicating the presence of the incorrectly sorted delivery item with the indicator, wherein the indicator is a light, and wherein indicating the presence of the incorrectly sorted delivery item comprises flashing the light.

17. The method of claim 13, further comprising tracking the delivery item along the sorting area conveyor with the indicator.

18. The method of claim 13, further comprising determining, with the computing system, an arrangement of the sorting area conveyor and the accumulator area conveyor relative to one another.

19. The method of claim 18, wherein determining, with the computing system, the arrangement of the sorting area conveyor and the accumulator area conveyor relative to one another comprises:
- disposing a test delivery item on the sorting area conveyor;
- receiving a signal from a sensor of the sorting area conveyor with the computing system;
- receiving a signal from a sensor of the accumulator area conveyor with the computing system; and
- determining, with the computing system, the arrangement of the sorting area conveyor and the accumulator area conveyor relative to one another with the signal from the sensor of the sorting area conveyor and the signal from the sensor of the accumulator area conveyor.

20. A system for sorting delivery items, the system comprising:
- a first sorting area and a second sorting area, each of the first and second sorting areas being configured to receive a plurality of delivery items, wherein each of the first and second sorting areas comprises:
  - a sorting area conveyor configured to move the plurality of delivery items from a first end portion towards a second end portion thereof;
  - a first sorting area sensor disposed in the first end portion of the sorting area conveyor and configured to determine the presence or absence of a delivery item from among the plurality of delivery items at the first end portion of the sorting area conveyor;
  - a second sorting area sensor disposed in the second end portion of the sorting area conveyor and configured to determine the presence or absence of the delivery item at the second end portion of the sorting area conveyor;
  - one or more sort locations disposed about the conveyor; and
  - one or more indicators configured to indicate a proper sort location of the one or more sort locations for the delivery item;
- a roller-table disposed directly adjacent to and downstream of the first sorting area, and configured to receive and store the delivery items from the first sorting area;
- an accumulator area disposed directly adjacent to and downstream of the second sorting area, and configured to receive and store the delivery items directly from the second sorting area, the accumulator area comprising:
  - an accumulator area conveyor configured to move the delivery items from a first end portion towards a second end portion thereof, the first end portion of the accumulator area conveyor disposed directly downstream of the second sorting area;
  - a first accumulator area sensor disposed in the first end portion of the accumulator area conveyor; and
  - a second accumulator area sensor disposed in the second end portion of the accumulator area conveyor; and
- a computing system operably coupled with the accumulator area and each of the first and second sorting areas, the computing system being configured to perform operations comprising:
  - determining the proper sort location of the one or more sort locations for the delivery item based at least in part on data related to an indicia of the delivery item;
  - sending a signal to the one or more indicators to indicate the proper sort location for the delivery item;
  - determining an arrangement of the first sorting area, the second sorting area, and the accumulator area relative to one another; and
  - determining an arrangement of the accumulator area conveyor and the respective sorting area conveyor of each of the first and second sorting areas relative to one another.

* * * * *